United States Patent
Bruennert et al.

(10) Patent No.: US 8,161,219 B2
(45) Date of Patent: Apr. 17, 2012

(54) DISTRIBUTED COMMAND AND ADDRESS BUS ARCHITECTURE FOR A MEMORY MODULE HAVING PORTIONS OF BUS LINES SEPARATELY DISPOSED

(75) Inventors: Michael Bruennert, München (DE); Peter Gregorius, München (DE); Georg Braun, Holzkirchen (DE); Andreas Gärtner, München (DE); Hermann Ruckerbauer, Moos (DE); George William Alexander, Durham, NC (US); Johannes Stecker, München (DE)

(73) Assignee: Qimonda AG, München (DE)

( * ) Notice: Subject to any disclaimer, the term of this patent is extended or adjusted under 35 U.S.C. 154(b) by 345 days.

(21) Appl. No.: 12/328,690

(22) Filed: Dec. 4, 2008

(65) Prior Publication Data

US 2010/0082871 A1 Apr. 1, 2010

Related U.S. Application Data

(60) Provisional application No. 61/101,602, filed on Sep. 30, 2008.

(51) Int. Cl.
*G06F 13/00* (2006.01)

(52) U.S. Cl. .............................. 710/305; 710/2; 711/211

(58) Field of Classification Search .......... 710/305–307, 710/316–317, 104–112, 1–3; 365/189.07, 365/236, 189.01, 189.05, 289.01, 206; 711/105, 711/167, 211

See application file for complete search history.

(56) References Cited

U.S. PATENT DOCUMENTS

| | | | | |
|---|---|---|---|---|
| 6,064,603 A * | 5/2000 | Naganawa | ............... | 365/189.07 |
| 6,392,897 B1 * | 5/2002 | Nakase et al. | ................ | 361/785 |
| 6,457,085 B1 * | 9/2002 | Reddy | ............................ | 710/305 |
| 6,553,450 B1 * | 4/2003 | Dodd et al. | .................... | 711/105 |
| 7,305,505 B2 * | 12/2007 | Cedar et al. | .................... | 710/104 |
| 7,840,748 B2 * | 11/2010 | Gower et al. | ................. | 711/105 |
| 2005/0038966 A1 | 2/2005 | Braun et al. | | |
| 2005/0086564 A1 * | 4/2005 | Frankowsky et al. | ......... | 714/718 |
| 2006/0095652 A1 * | 5/2006 | Ruckerbauer | ................. | 711/105 |
| 2006/0202328 A1 | 9/2006 | Braun et al. | | |
| 2007/0008328 A1 * | 1/2007 | MacWilliams et al. | ....... | 345/530 |
| 2007/0058408 A1 | 3/2007 | Ruckerbauer et al. | | |

* cited by examiner

*Primary Examiner* — Raymond Phan
(74) *Attorney, Agent, or Firm* — Cozen O'Connor

(57) ABSTRACT

Distributed command and address bus architecture for memory modules and circuit boards is described. In one embodiment, a memory module includes a plurality of connector pins disposed on an edge of a circuit board, the plurality of connector pins comprising first pins coupled to a plurality of data bus lines, second pins coupled to a plurality of command and address bus lines, wherein the second pins are disposed in a first and a second region, wherein a portion of the first pins is disposed between the first and the second regions.

28 Claims, 8 Drawing Sheets

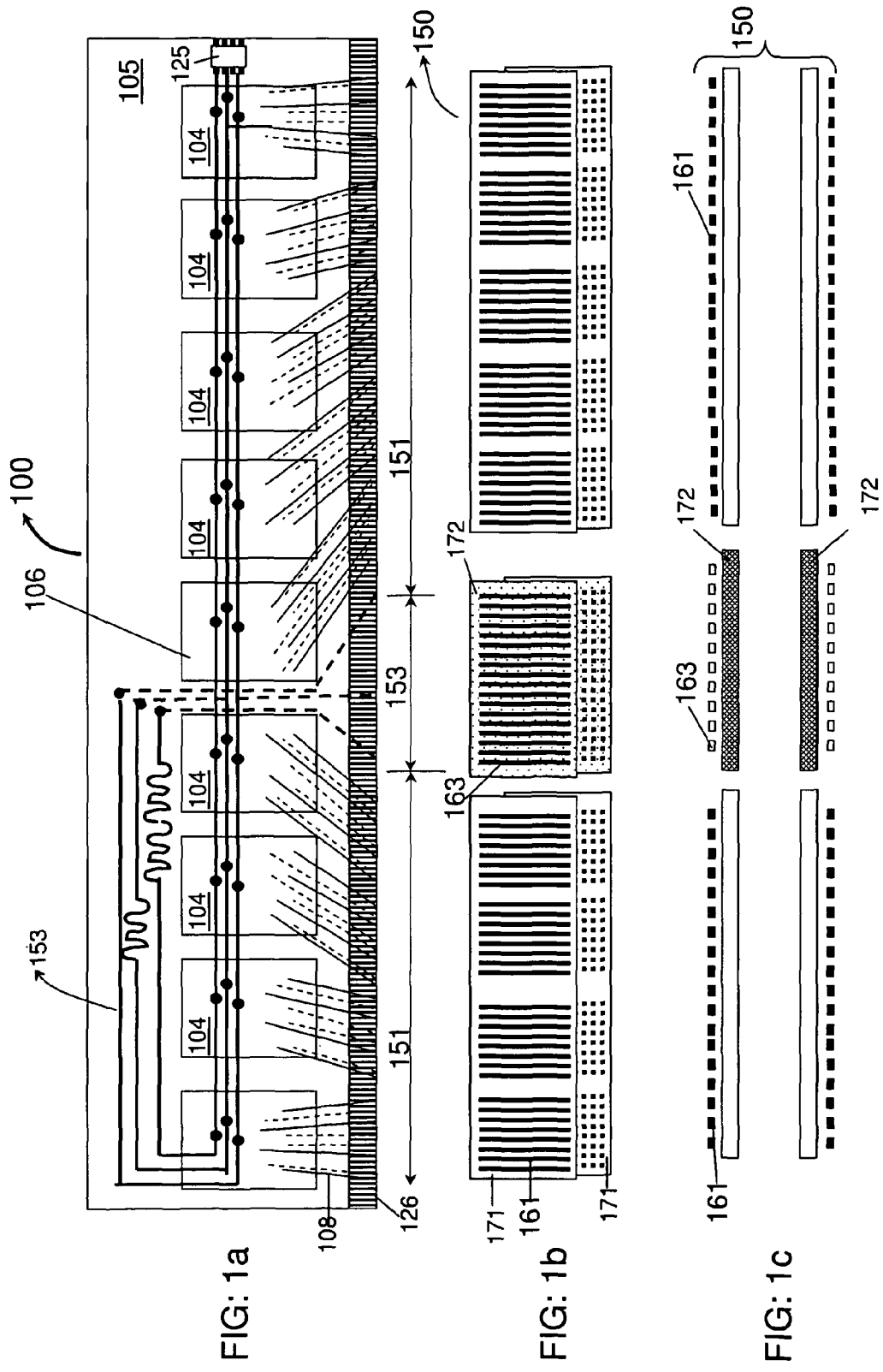

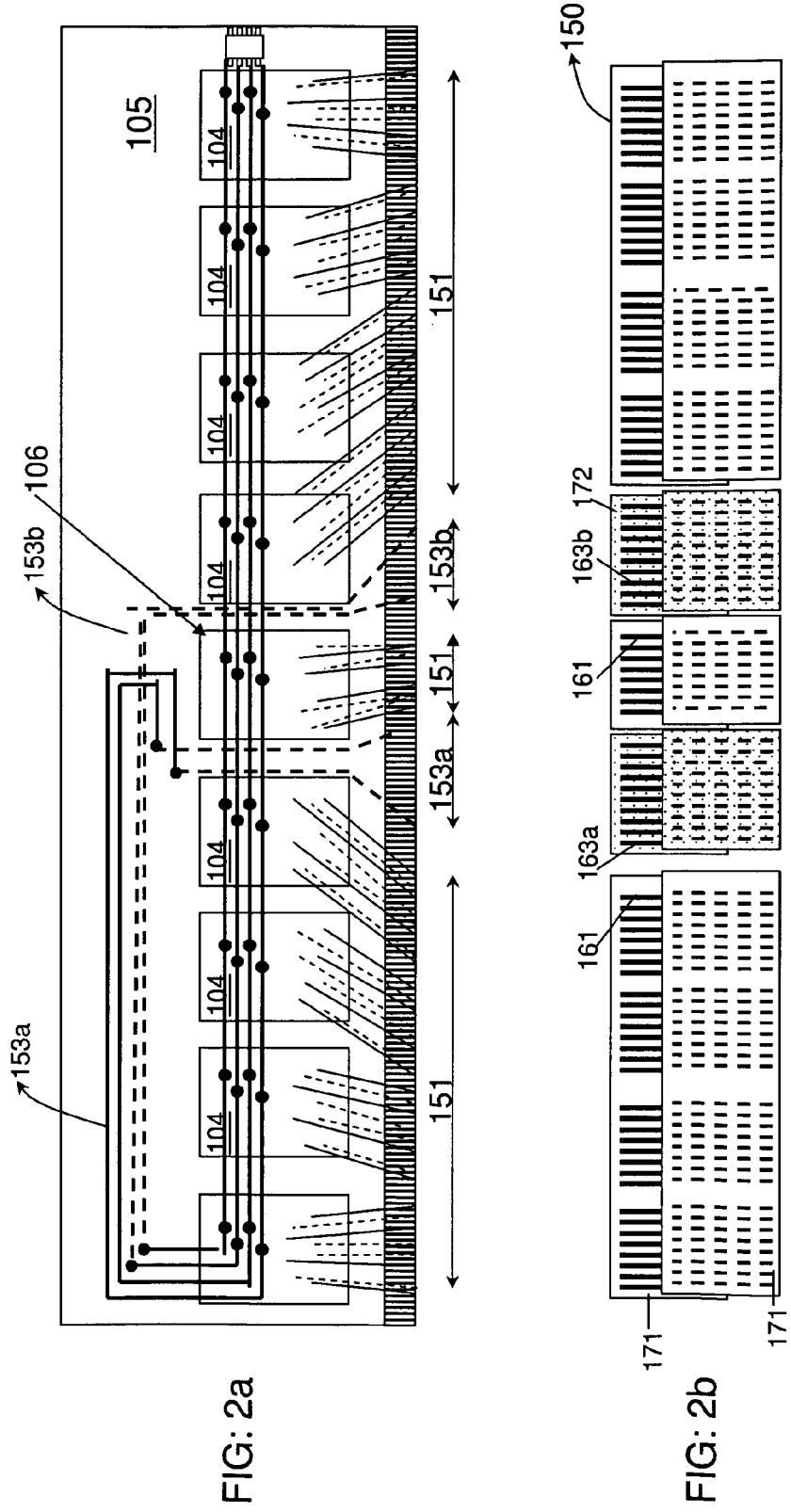
FIG: 2a
FIG: 2b

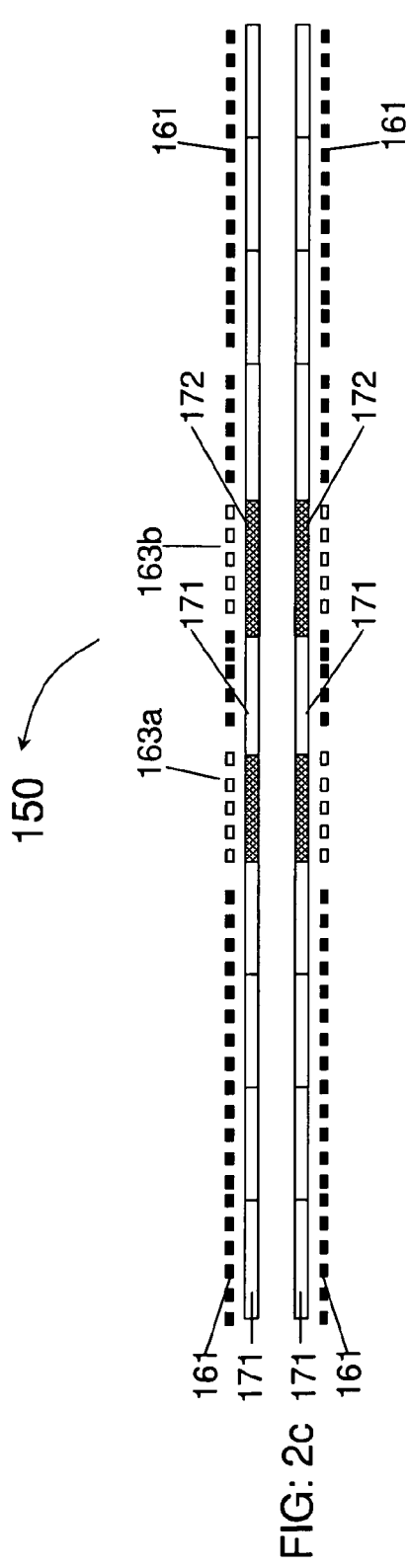
FIG: 2c
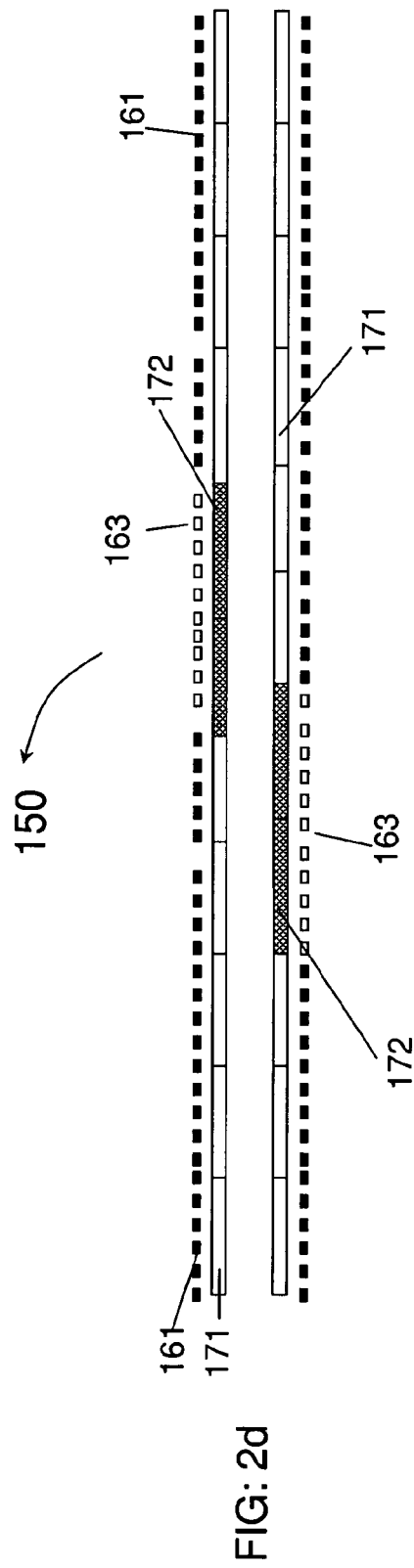
FIG: 2d

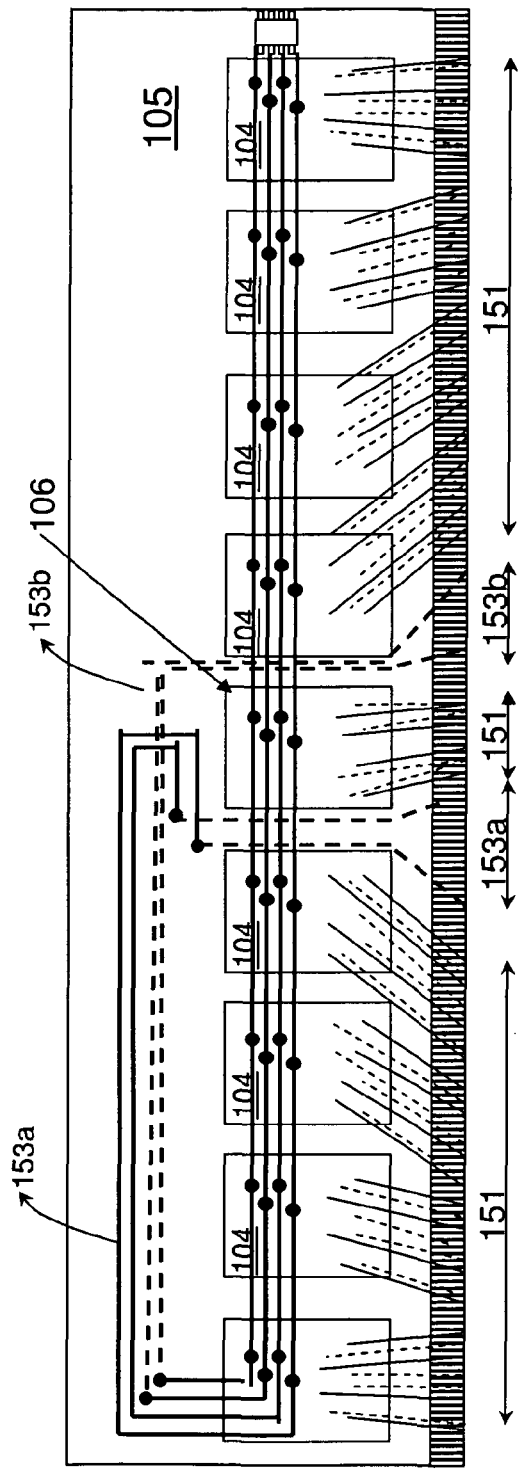
FIG: 3a

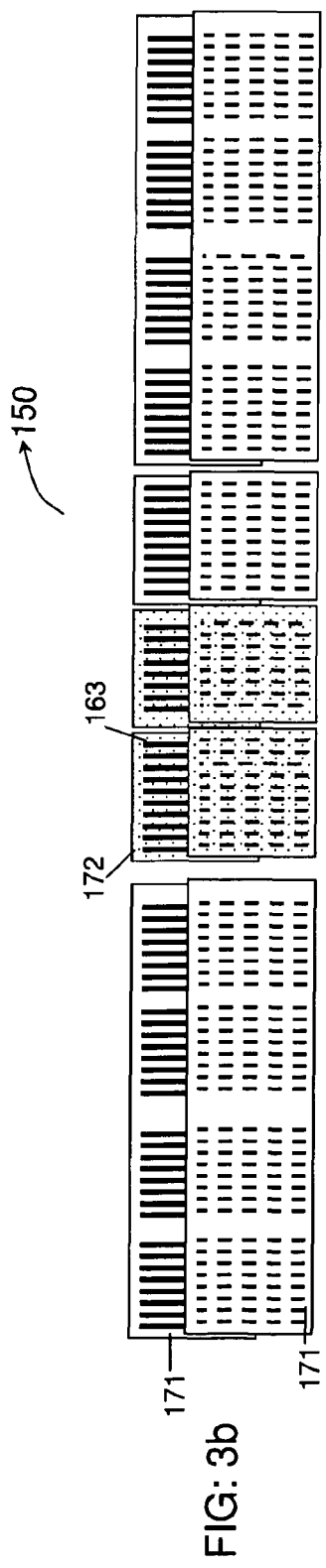
FIG: 3b
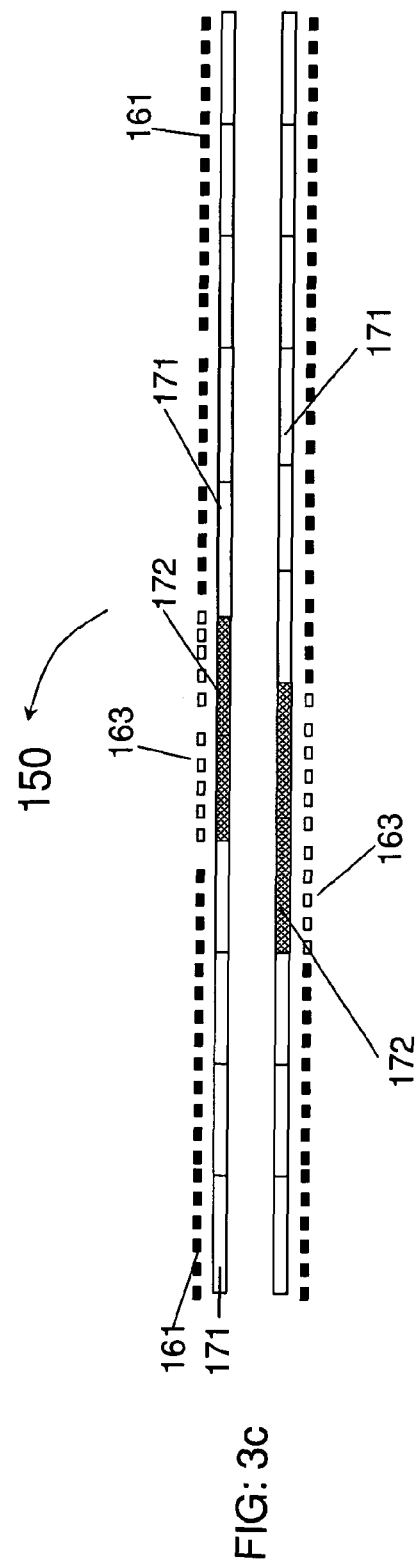
FIG: 3c

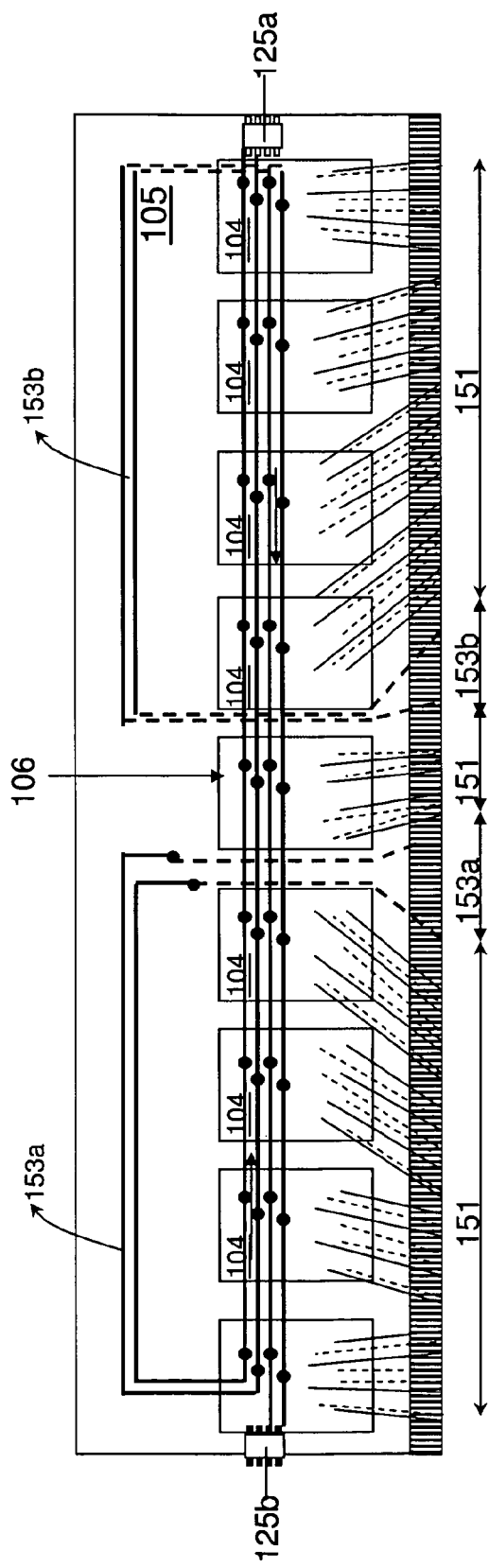
FIG: 4

DISTRIBUTED COMMAND AND ADDRESS BUS ARCHITECTURE FOR A MEMORY MODULE HAVING PORTIONS OF BUS LINES SEPARATELY DISPOSED

This application claims the benefit of U.S. Provisional Application No. 61/101,602, filed on Sep. 30, 2008, entitled "Distributed Command and Address Bus Architecture," which application is hereby incorporated herein by reference in its entirety.

TECHNICAL FIELD

The present invention relates generally to computing systems and, more particularly, to distributed command and address bus architecture.

BACKGROUND

Memory devices are used in many applications, such as computers, calculators, and cellular phones, as examples. Packaging of memory devices varies in different applications. For many years, single in-line memory modules (SIMMs) were used in computers. However, beginning with memory used for more recent 64-bit processors, dual in-line memory modules (DIMMs) have become more common. DIMMs have separate electrical contacts on each side of the module, while the contacts on SIMMs on both sides are redundant. Dual in-line memory module comprises an array of dynamic random access memory integrated circuits. The memory modules are mounted on a printed circuit board and designed for use in computing systems including hand held devices, lap tops, personal computers, workstations and servers.

The DIMMs are coupled to the mother board through connection pins located on a bottom edge. The number of pins varies based on the type of memory. For example, a 240 connector pin DIMM is used for double-data-rate two synchronous dynamic random access memory (DDR2 SDRAM), DDR3 SDRAM and FB-DIMM DRAM, whereas a 184 connector pin DIMM is used for DDR SDRAM.

Memory devices with improved performance are required at every technology node. However, the design of the memory modules such as DIMMs creates bottlenecks that hamper improvements in performance. Hence, memory modules with improved design are needed to overcome these limitations.

SUMMARY OF THE INVENTION

These and other problems are generally solved or circumvented, and technical advantages are generally achieved, by preferred embodiments of the present invention.

Embodiments of the invention include distributed command and address lines, architecture for memory modules, and memory buses. In accordance with a preferred embodiment of the present invention, a memory module comprises a plurality of connector pins disposed on an edge of a circuit board, the plurality of connector pins comprising first pins coupled to a plurality of data bus lines, second pins coupled to a plurality of command and address bus lines, wherein the second pins are disposed in a first and a second region, wherein a portion of the first pins is disposed between the first and the second regions.

The foregoing has outlined rather broadly, the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 1, which includes FIGS. 1a-1c, illustrates a conventional memory module and memory bus lines on a mother board;

FIG. 2, which includes FIG. 2a-2d, illustrates a distributed command and address bus, wherein FIG. 2a illustrates a memory module and FIGS. 2b and 2c illustrate a mother board, in accordance with an embodiment of the invention;

FIG. 3, which includes FIG. 3a-3c, illustrates a distributed command and address bus, wherein FIG. 3a illustrates a memory module and FIGS. 3b and 3c illustrate a circuit board, in accordance with an embodiment of the invention;

FIG. 4 illustrates a distributed command and address bus in a memory module, in accordance with an embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 5:
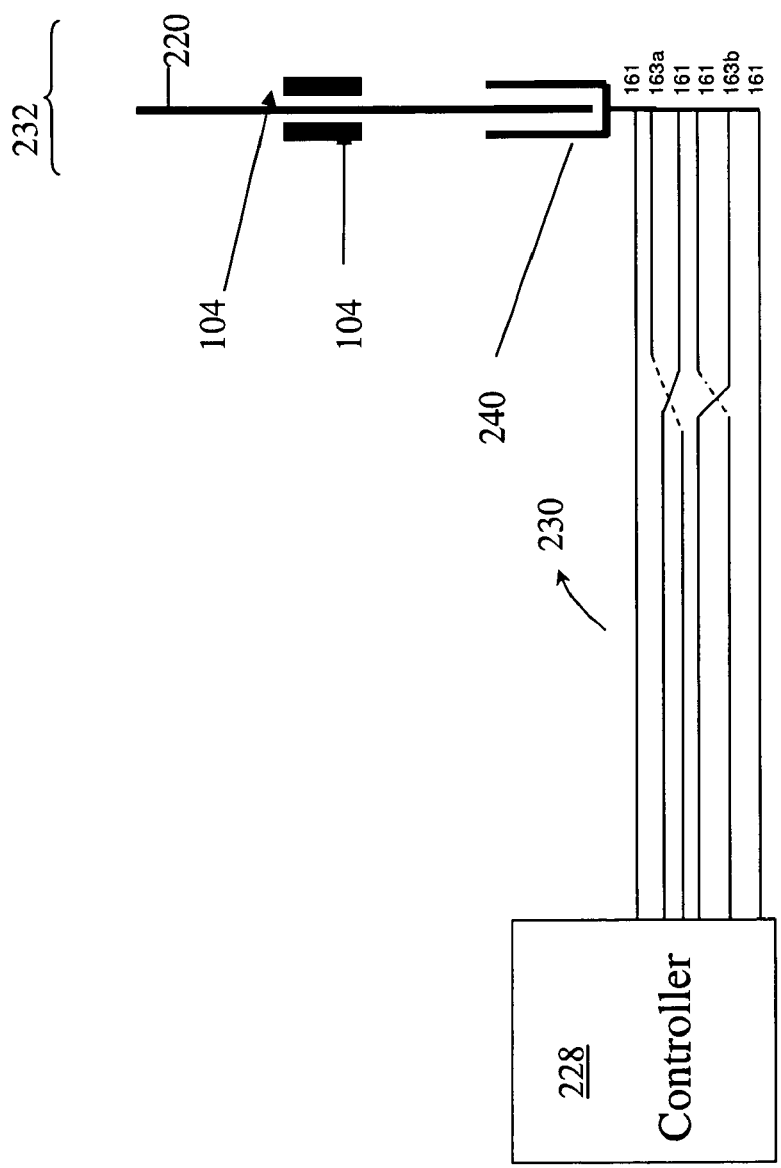
FIG. 5 illustrates a memory bus coupling a memory controller to a memory using embodiments of the invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a dual in-line memory module. The invention may also be applied, however, to other types of memory modules.

The present invention will be described with respect to preferred embodiments in a specific context, namely a dual inline memory module. The invention may also be applied, however, to other types of memory modules.

Manufacturing semiconductor memory with increasing performance requires improving all aspects of the memory device. One of the bottle necks in current memory performance is the length of the metal routings, for example, data lines within the DIMMs. The routing length between the memory chips and the DIMM connection pins can not be reduced due to layout restrictions on the conventional DIMM. Routing or wiring through the circuit board within the DIMM is limited by the required arrangement of the data and command bus lines on the connection pins. In various embodiments, the invention overcomes these limitations by providing an improved design for the routings in the memory module as well as the underlying circuit boards.

FIG. 1, which includes FIGS. 1a-1c, illustrates a conventional memory module and a circuit board showing the bus lines, wherein FIG. 1a illustrates a memory module and FIGS. 1b and 1c illustrate a circuit board.

FIG. 1a illustrates a known dual inline memory module (DIMM) 100. DIMM 100 includes a number of memory chips 104, e.g., dynamic random access memory (DRAM) attached to a circuit board 105. Being an ECC DIMM, an error correction code (ECC) device 106 is disposed on the DIMM 100. The ECC device 106 enables automatic detection and correction of errors without any user intervention.

A typical ECC DIMM 100 comprises 9 devices per side, four memory chips 104 disposed left of the ECC device 106 and another four memory chips 104 disposed on the right of the ECC device 106. A similar arrangement of memory chips 104 and ECC device 106 is formed on the back side of the DIMM 100. The back side is illustrated as dashed line in the Figures.

The command and address bus lines 153 comprising the command and address lines, the control lines and the clock signal lines are disposed centrally. Typical command and address bus lines 153 consist of twenty five command and address signal lines, six control signal lines, and four clock signal lines.

The data bus lines 151 comprising the data signal (DQ) and the data strobe signal (DQS), and data mask (DM) signal lines are formed on either side of the command and address bus lines 153. Typically, each memory chip contains data bus lines 151 consisting of eight data signal lines, two data strobe signal lines, and two data mask signal lines.

FIG. 1a also illustrates a sample wiring (e.g., data stubs 108) within the circuit board 105 to connect the memory chips 104. The command and address bus lines 153 are illustrated in FIG. 1a.

The wiring of the sections of the command and address bus lines 153 closest to the memory chips 104 include further meandering to minimize length mismatch between the individual lines of the command and address bus lines 153. The command and address bus lines 153 terminate on a termination device 125.

The load on the data bus lines varies with the stub length (stubs 108 in the DIMM 100). For example, the data line (DQ) stub is shortest for the memory chip 104 disposed directly above the corresponding data bus line 151 contact on the connector pin 126 (See FIG. 1a). However, the ECC device 106 and/or the centrally located memory chip 104 comprises the longest stub length. In a typical DIMM 100, this difference in stub length can be significant and result in mismatched loading between the memory chips 104.

Connector pins 126 are disposed on a top and bottom edge of the circuit board 105, and the circuit board 105 includes wiring to connect the memory chips 104 and the ECC device 106 to the connector pins 126.

The DIMM 100 is connected to a memory socket of a circuit board, e.g., a mother board 150 through the connector pins 126. The corresponding bus on the mother board 150 is shown in FIGS. 1b and 1c.

FIGS. 1b and 1c illustrate the arrangement of the mother board 150 coupled to the memory module 100, wherein FIG. 1b illustrates a top view and FIG. 1c illustrates a cross sectional view.

The mother board 150 comprises data bus 161 and command and address bus 163. The data bus 161 on the mother board 150 is coupled to the data bus lines 151 on the DIMM 100 through a memory socket. The command and address bus 163 is coupled to the command and address bus lines 153 on the DIMM 100. The command and address bus 163 is disposed centrally around the memory bus for backward compatibility with memory controllers.

The data bus 161 and the command and address bus 163 are disposed adjacent a potential shield to minimize interference effects. In one embodiment, the data bus 161 is disposed over a first plate 171 coupled to $V_{SS}$ node, and the command and address bus 163 is disposed over a second plate 172 coupled to $V_{DD}$ node.

In various embodiments, the present invention overcomes these limitations by using a layout configuration that minimizes variation in stub length of the data line on the DIMM 100 by varying the location of the data bus lines 151 and the command and address bus lines 153.

In various embodiments, the command and address bus lines 153 are split into multiple sections minimizing the need to form long stubs within the circuit board 105. Further, using multiple sections of command and address bus lines 153, the stub lengths between each memory chips 104 can be matched or the differences can be significantly reduced.

An embodiment of the invention illustrating a structure of the memory module and corresponding part of a mother board is described in FIG. 2. Further structural embodiments of the invention are illustrated in FIGS. 3-5.

FIG. 2, which includes FIGS. 2a-2d, illustrates an embodiment of the memory module illustrating command and address bus and data bus lines. FIG. 2a illustrates a top view of a memory module and a corresponding section of the mother board, whereas FIGS. 2b-2d illustrate top and cross sectional views of the mother board at different locations.

Referring to FIG. 2a, the command and address bus lines 153 on the DIMM 100 are divided into two sections: a first command and address bus line 153a, and a second command and address bus line 153b. The first and the second command and address bus lines 153a and 153b loop through the circuit board 105 so that the length of the first and the second command and address bus lines 153a and 153b are about the same, thus minimizing any variation in impedance between the two paths. Further, as illustrated in FIG. 2a, individual lines within the first command and address bus line 153a are arranged to comprise a similar length.

Referring to FIGS. 2b and 2c, the data bus lines 151 on the DIMM 100 are coupled to the data bus 161 on mother board 150. The data bus 161 is disposed above a reference potential plane. In one embodiment, the reference potential plane is provided by the first plate 171 coupled to a $V_{SS}$ node (ground) in one embodiment.

The mother board 150 also comprises corresponding first command and address bus 163a and second command and address bus 163b as illustrated in FIGS. 2b and 2c. As illustrated in FIGS. 1b and 1c, the first and the second command and address bus 163a and 163b are disposed above the second plate 172 coupled to a $V_{DD}$ node in one embodiment.

FIG. 2d illustrates a cross sectional view of the mother board at a location proximate the memory controller of the computing system. As illustrated in FIG. 2d, the layout of the first command and address bus 163a and second command and address bus 163b is changed within the mother board so as to merge the first command and address bus 163a and second command and address bus 163b into a single command and address bus 163. Accordingly the individual lines of the data bus 161 are repositioned. Such a repositioning of the memory bus within the mother board 150 enables backward compatibility with joint electron device engineering council (JEDEC) standards for controller design. This rearrangement of the bus lines is not needed in embodiments not requiring backward compatibility.

FIG. 3, which includes FIGS. 3a-3c, illustrates an embodiment of the memory module.

Referring to FIG. 3a, the DIMM 100 is similar to the embodiment illustrated in FIG. 2a. As described in FIG. 2a, the command and address bus lines 153 are divided into a first command and address bus line 153a, and a second command and address bus line 153b separated by a data bus lines 151.

However unlike FIGS. 2b and 2c, the command and address bus 163 on the mother board 150 is not divided into two sections. Instead, an adapter (not shown) is attached between the connector pins 126 of the DIMM 100 and the memory module socket on the mother board 150. The adapter exchanges, or rearranges, the relative positions of the data bus lines 151 and the command and address bus lines 153 such that the individual lines of the command and address bus 163 are laid out together (as illustrated in FIGS. 3b and 3c) on the mother board 150.

FIG. 4 illustrates a top view of a memory module illustrating the command and address bus and data bus lines in accordance with an embodiment of the invention.

As illustrated in FIG. 4, the command and address bus lines 153 on the DIMM 100 are divided into two sections: a first command and address bus line 153a, and a second command and address bus line 153b. However, unlike the prior embodiments, the command and address bus lines 153 are split into two separate loops terminating on different ends of the DIMM 100.

The first loop comprising the first command and address bus lines 153a terminates on the first termination device 125a, whereas the second loop comprising the second command and address bus lines 153b terminates on the second termination device 125b.

In this embodiment, additional clock lines are added to the control and address bus lines 163. The additional clock lines supply a timing reference to the memory chips 104. Using the two clock signals and mixing the phase information creates a new clock phase that is the same for each of the memory chips 104. Alternately, a PLL or phase adjusting method can be used.

FIG. 5 illustrates a computing system 260 comprising memory modules coupled through memory channels on the mother board in accordance with an embodiment of the invention.

Referring to FIG. 5, a memory bus 230 connects the controller 228 and the memory 232. The memory bus 230 transfers information between the memory controller 228 and the memory 232.

The memory 232 comprising memory modules 220 is attached to a socket on the mother board of the computing system. The memory bus 230 is thus coupled to the memory controller 228 through memory sockets 240. The memory sockets 240 contain openings for pins of memory modules 220 that are detachably attached by the user.

As described above, the command and address lines are distributed into two sections, for example, first command and address lines 163a and second command and address lines 163b (for example, as illustrated in FIG. 2c). Immediately adjacent the memory 232, a portion of the data bus lines 161 is disposed between the first command and address lines 163a and the second command and address lines 163b.

The wiring of the mother board is designed such that the memory bus 230 adjacent the memory controller comprises a different configuration. In particular, the first and the second command and address lines 163a and 163b merge together (for example, as illustrated in FIG. 2d). This enables backward compatibility with the standards for the memory controller 228.

In various embodiments, the memory 232 comprising the memory modules 220, the memory sockets 240, the mother board 150 comprising the memory bus 230, and/or combination thereof include the embodiments described above.

Figure 6:
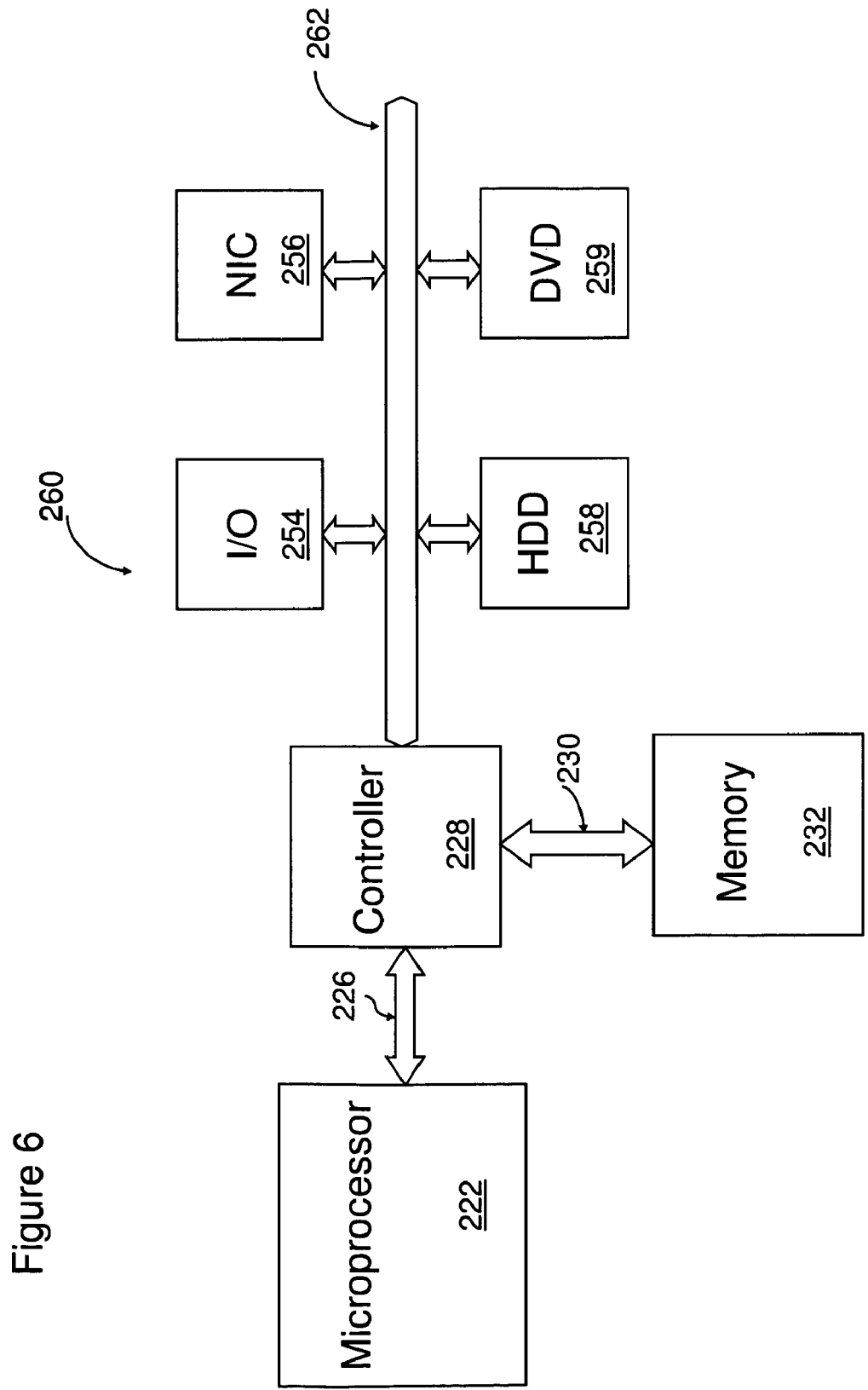
FIG. 6 illustrates a computing system using embodiments of the invention.

FIG. 6 illustrates a computing system using the embodiments described above.

Referring to FIG. 6, the computing system 260 includes a microprocessor 222, which is coupled to the controller 228 via microprocessor bus 226. In this example, the controller 228 serves the combined purpose of serving as a memory controller and also as a bus interface controller or bridge (e.g., north bridge). In other systems, separate devices could be used for these tasks.

A central bus 262 is coupled to a number of components and communicates with the microprocessor 222 via the controller 228. Four examples of components that can be coupled to the central bus 262 are shown, i.e., user input/output 254 (which could include a display, mouse, keyboard, microphone, or other peripheral device), network interface card 256, hard disk drive 258, and DVD drive 259. These examples are provided only to show the types of devices that can be utilized in a computing system 260. Other busses or components could be used. A memory bus 230 connects the controller 228 and the memory 232.

The microprocessor 222 may comprise the CPU of the computing system 260, for example. In one embodiment, a memory 232 comprises a DRAM memory module as described in the prior embodiments above. The memory 232 may comprise other types of memories along with the DRAM memory modules. The typical memory 232 comprises DRAM devices packaged as memory modules 220, for example, dual inline memory modules (DIMM) or single inline memory modules (SIMM).

Embodiments described above have been directed to DRAM DIMMs, but in other embodiments can be any circuit board. Similarly, other types of memory modules besides DIMMs may be used in other embodiments.

Although the present invention and its advantages have been described in detail, it should be understood that various changes, substitutions and alterations can be made herein without departing from the spirit and scope of the invention as defined by the appended claims. For example, it will be readily understood by those skilled in the art that many of the features, functions, processes, and materials described herein may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A memory module comprising:
 a plurality of memory chips disposed on a circuit board;
 a plurality of connector pins disposed on an edge of the circuit board;
 a plurality of data bus lines coupling the plurality of memory chips with the plurality of connector pins; and
 a plurality of command and address bus lines coupling the plurality of memory chips with the plurality of connector pins, the plurality of command and address bus lines comprising a first section and a second section, the first section and the second section being separated by a portion of the plurality of data bus lines.

2. The memory module of claim 1, wherein each line of the plurality of command and address bus lines has about the same electrical length.

3. The memory module of claim 1, wherein the plurality of command and address bus lines comprises lines for command lines, address lines, control lines, and clock lines.

4. The memory module of claim 1, wherein the plurality of command and address bus lines is compliant with dual data rate four (DDR4) standard.

5. The memory module of claim 1, wherein the plurality of data bus lines comprises data lines (DQ), data strobe lines (DQS), data mask lines (DM), and read data strobe lines (RDQS).

6. The memory module of claim 1,
 wherein the first section of the plurality of command and address bus lines loops around the circuit board in a first direction, wherein the second section of the plurality of command and address bus lines loops around the circuit board in a second direction opposite the first direction.

7. The memory module of claim 6, wherein the plurality of command and address bus lines comprises more than four clock signal lines.

8. The memory module of claim 1, wherein the first and second sections loop around the circuit board in the same direction.

9. A memory module comprising:
 a plurality of connector pins disposed on an edge of a circuit board, the plurality of connector pins comprising first pins coupled to a plurality of data bus lines, second pins coupled to a plurality of command and address bus lines,
 wherein the second pins are disposed in a first and a second region,
 wherein a portion of the first pins is disposed between the first and the second regions.

10. The memory module of claim 9, wherein each line of the plurality of command and address bus lines has about the same electrical length.

11. The memory module of claim 9, wherein the plurality of command and address bus lines comprises lines for command lines, address lines, control lines and clock lines, and wherein the plurality of data bus lines comprises data lines, data strobe lines, data mask lines, and read data strobe lines.

12. The memory module of claim 9,
 wherein the plurality of command and address bus lines coupled to the first region of the second pins loop around the circuit board in a first direction, and wherein the plurality of command and address bus lines coupled to the second region of the second pins loop around the circuit board in a second direction opposite the first direction.

13. The memory module of claim 9, wherein the plurality of command and address bus lines coupled to the first and the second regions of the second pins loop around the circuit board in the same direction.

14. A memory module comprising:
 a circuit board comprising a first side and an opposite second side;
 a first plurality of memory chips disposed on the first side;
 a second plurality of memory chips disposed on the second side;
 a first plurality of connector pins disposed on an edge of the circuit board, the first plurality of connector pins disposed on the first side;
 a second plurality of connector pins disposed on the edge and on the second side;
 a first plurality of data bus lines disposed on the first side, the first plurality of data bus lines coupling the first plurality of memory chips with the first plurality of connector pins;
 a second plurality of data bus lines disposed on the second side, the second plurality of data bus lines coupling the second plurality of memory chips with the second plurality of connector pins;
 a first plurality of command and address bus lines disposed on the first side, the first plurality of command and address bus lines coupling the first plurality of memory chips with the first plurality of connector pins; and
 a second plurality of command and address bus lines disposed on the second side, the second plurality of command and address bus lines coupling the second plurality of memory chips with the second plurality of connector pins, wherein the first plurality of command and address bus lines is shifted relative to the second plurality of command and address bus lines.

15. The memory module of claim 14, wherein the first plurality of command and address bus lines comprises a first section and a second section, the first section and the second section being separated by a portion of the first plurality of data bus lines.

16. The memory module of claim 15, wherein the second plurality of command and address bus lines comprises a first part and a second part, the first part and the second part being separated by a portion of the second plurality of data bus lines.

17. A memory bus for coupling a memory module to a memory controller, the memory bus comprising:
 a circuit board;
 a plurality of data bus lines disposed in the circuit board; and
 a plurality of command and address lines disposed in the circuit board, wherein in a first region proximate the memory module, the plurality of command and address lines comprises a first and a second set of command and address lines, wherein in the first region a portion of the plurality of data bus lines is disposed between the first and the second set of command and address lines, and wherein in a second region proximate the memory controller, the first and the second set of command and address lines are disposed together.

18. The memory bus of claim 17, wherein in the first region, an arrangement of the plurality of command and address lines and the plurality of data bus lines is compatible with preexisting standards for memory controller design.

19. The memory bus of claim 17, wherein the plurality of command and address lines comprises lines for command lines, address lines, control lines, and clock lines, and wherein the plurality of data bus lines comprises data lines, data strobe lines, data mask lines, and read data strobe lines.

20. The memory bus of claim 17, wherein the plurality of data bus lines and the plurality of command and address lines are compliant with dual data rate four (DDR4) standard.

21. A computing system comprising:
   a first circuit board;
   a processor disposed on the first circuit board;
   a memory controller disposed on the first circuit board; and
   a memory bus disposed on the first circuit board, the memory bus coupling the memory controller to a memory module, the memory module comprising:
      a plurality of data lines disposed on a second circuit board,
      a plurality of command and address lines disposed on the second circuit board, and
      a plurality of connector pins disposed on an edge of the second circuit board, the plurality of connector pins comprising a plurality of first pins coupled to the plurality of data lines, a plurality of second pins coupled to the plurality of command and address lines, wherein the plurality of second pins is disposed in a first and a second region, wherein a portion of the plurality of first pins is disposed between the first and the second regions.

22. The computing system of claim 21, wherein each line of the plurality of command and address lines has about the same electrical length on the second circuit board.

23. The computing system of claim 21, wherein the plurality of command and address lines comprises lines for command lines, address lines, control lines, and clock lines, and wherein the plurality of data lines comprises data lines, data strobe lines, data mask lines, and read data strobe lines.

24. The computing system of claim 21, wherein the plurality of command and address lines coupled to the first region of the plurality of second pins loop around the second circuit board in a first direction, and wherein the plurality of command and address lines coupled to the second region of the plurality of second pins loop around the second circuit board in a second direction opposite the first direction.

25. The computing system of claim 21, wherein the plurality of command and address lines coupled to the first and the second regions of the plurality of second pins loop around the second circuit board in the same direction.

26. The computing system of claim 21, wherein the memory bus comprises:
   a plurality of data bus lines disposed in the first circuit board; and
   a plurality of command and address bus lines disposed in the first circuit board, wherein in a third region proximate the memory module, the plurality of command and address bus lines comprises a first and a second set of command and address bus lines, wherein a portion of the plurality of data bus lines is disposed between the first and the second set of command and address bus lines, and wherein in a fourth region proximate the memory controller, the first and the second set of command and address bus lines are disposed together.

27. The computing system of claim 26, wherein in the third region, an arrangement of the plurality of command and address bus lines and the plurality of data bus lines is compatible with preexisting standards for memory controller design.

28. The computing system of claim 26, wherein the plurality of data bus lines on the first circuit board is coupled to the plurality of data lines on the second circuit board through the plurality of first pins; and wherein the plurality of command and address bus lines on the first circuit board are coupled to the plurality of command and address lines on the second circuit board through the plurality of second pins.

* * * * *